United States Patent [19]

Wilson et al.

[11] Patent Number: 5,241,586
[45] Date of Patent: Aug. 31, 1993

[54] VOICE AND TEXT ANNOTATION OF A CALL LOG DATABASE

[75] Inventors: Timothy L. Wilson; Cathy Arledge, both of Austin; Gordon Ford, Round Rock; Tracy L. Rust, Austin, all of Tex.

[73] Assignee: ROLM Company, Santa Clara, Calif.

[21] Appl. No.: 691,959

[22] Filed: Apr. 26, 1991

[51] Int. Cl.⁵ .................. H04M 1/64; H04M 1/56; H04M 15/00
[52] U.S. Cl. .................. 379/88; 379/67; 379/89; 379/142; 379/112; 379/113; 379/130
[58] Field of Search .......... 379/67, 88, 89, 142, 379/113, 112, 131, 130

[56] References Cited

U.S. PATENT DOCUMENTS

| | | | |
|---|---|---|---|
| 4,782,517 | 11/1988 | Bernardis et al. | 379/201 |
| 4,837,798 | 6/1989 | Cohen et al. | 379/396 |
| 4,914,586 | 4/1990 | Swinehart et al. | 379/94 |
| 5,008,926 | 4/1991 | Misholi | 379/96 |

*Primary Examiner*—James L. Dwyer
*Assistant Examiner*—Fan Tsang
*Attorney, Agent, or Firm*—Michael B. Einschlag

[57] ABSTRACT

Method and apparatus for automatically receiving, storing, and reviewing call activity information and call annotation information, which method and apparatus provides logical connections between the call annotation information and call activity information.

12 Claims, 3 Drawing Sheets

VOICE AND TEXT ANNOTATION OF A CALL LOG DATABASE

TECHNICAL FIELD OF THE INVENTION

The present invention pertains to method and apparatus for annotating a call log database and, in particular, to method and apparatus for annotating a call log database with voice and text information.

BACKGROUND OF THE INVENTION

Call annotation refers to the function of receiving, storing, and reviewing information relating to the substance of a telephone call. As those in art understand, call annotation is different from the function of receiving, storing, and reviewing call activity information—call activity information being defined, for example, as information comprising, among other things: (a) telephone numbers of calling and called parties for a telephone call; (b) name of the calling and called parties, if known; (c) time and date of the telephone call; (d) duration of the telephone call; and (e) status of call, i.e., busy, answered, and so forth.

Several methods are presently used to provide call annotation. These methods include the use of: (a) a handwritten log; (b) a dictation machine or tape recorder; and (c) an information organizer such as an IBM Information Organizer system provided by International Business Machines Company. However, each of these methods suffer from one or more drawbacks.

In particular, if one uses a handwritten log, a dictation machine, or a tape recorder to capture call annotation information, one does not obtain automatically a logical connection between call activity information and any associated call annotation information. As a result, if one wants to associate call activity information with call annotation information, one must repeat the call activity information in the handwritten log or recording device. Consequently, one drawback of present methods which utilize a handwritten log or a recording device is that they do not provide for retrieving call annotation information automatically while one searches call activity information. Thus, for example, if one uses a handwritten log, one cannot retrieve all call annotation information relating to telephone calls made to or from a predetermined telephone number because the call annotation information is not logically connected to call activity information relating to that telephone number. As a consequence, in order to retrieve all call annotation information relating to telephone calls made to or from the predetermined telephone number, the entire call log database must be reviewed and each entry must be searched for a match with the predetermined telephone number.

In addition, if one uses a recording device such as a tape recorder or a dictation machine to capture call annotation information, one is required to record entire telephone conversations. Thus, although this method provides an automatic record of conversations, one is required to listen to entire conversations to obtain an overview of the call contents.

A method such as that implemented in a software system known as the IBM Information Organizer system provides a means for associating, i.e., linking, call annotation information with call activity information. However, this system suffers from the drawback that it does not provide voice annotation and the system suffers from the drawback that a user cannot call and retrieve call annotation information off-premises, i.e., remotely.

As a result of the above, there is a need in the art for method and apparatus for automatically receiving, storing, and reviewing call activity information and call annotation information, which method and apparatus provides logical connections between the call annotation information and call activity information. Further, there is a need for such a method and apparatus wherein call annotation information may be provided by voice, text, or facsimile input and wherein text and facsimile input may be converted to voice and vice versa. Still further, there is a need for such a method and apparatus wherein converted text and facsimile annotations or voice annotations may be reviewed remotely or locally.

SUMMARY OF THE INVENTION

Embodiments of the present invention advantageously satisfy the above-identified need in the art and provide method and apparatus for automatically receiving, storing, and reviewing call activity information and call annotation information, which method and apparatus provides logical connections between the call annotation information and call activity information. Call activity information being defined, for example, as including some or all of the following: (a) telephone numbers of calling and called parties; (b) name of the calling and called parties, if known; (c) time and date of the telephone call; (d) duration of the call; and (e) status of call, i.e., busy, answered, and so forth. In particular, in accordance with a preferred embodiment of the present invention, a logical connection, for example, a link, is created in a call log database between call annotation information and call activity information. Further, in a preferred embodiment of the present invention, the call annotation information may be provided by voice, text, or facsimile input and, in the preferred embodiment of the present invention, text and facsimile input may be converted to voice and vice versa. Still further, converted text and facsimile annotations or voice annotations may be reviewed remotely or locally.

Embodiments of the present information advantageously enable a user to retrieve call annotation information from a call log database on the basis of call activity information. This means that the user can search the call log database, for example, by using the following types of selection criteria: (a) telephone calls placed within specified times of day; (b) telephone calls placed on specified dates; (c) telephone calls placed to or received from specified calling parties or called parties—the calling or called parties being specified, for example, by name or telephone number; or (d) combinations of the foregoing.

Embodiments of the present invention advantageously enable a user to interact with the system remotely, i.e., using off-premises telephone equipment. This enables a user to review voice annotation information remotely or locally and the user may review text annotation information remotely after it has been transformed to voice or facsimile. For example, in one embodiment of the present invention, a user places a telephone call to an embodiment of the present invention system and requests a transfer to a particular called party. In response, the embodiment logs the call activity information and the user can record a spoken summary of the call after completion thereof. Additional benefits of off-premises access, beyond the benefit of providing call annotation capabilities, is that long distance calls could take advantage of any available route optimization and that the long distance charges could be billed directly to the system. While these latter additional benefits of route optimization and direct billing are available in the prior art, for example, in the form of a DISA function provided by a ROLM CBX switching machine, which switching machine is manufactured by ROLM Systems of Santa Clara, California, DISA does not provide a method for maintaining call summaries—DISA allows a person to call into the ROLM CBX on a special number, supply a password, and then be transferred to the desired number.

BRIEF DESCRIPTION OF THE DRAWING

A complete understanding of the present invention may be gained by considering the following detailed description in conjunction with the accompanying drawing, in which.

DETAILED DESCRIPTION

Figure 1:
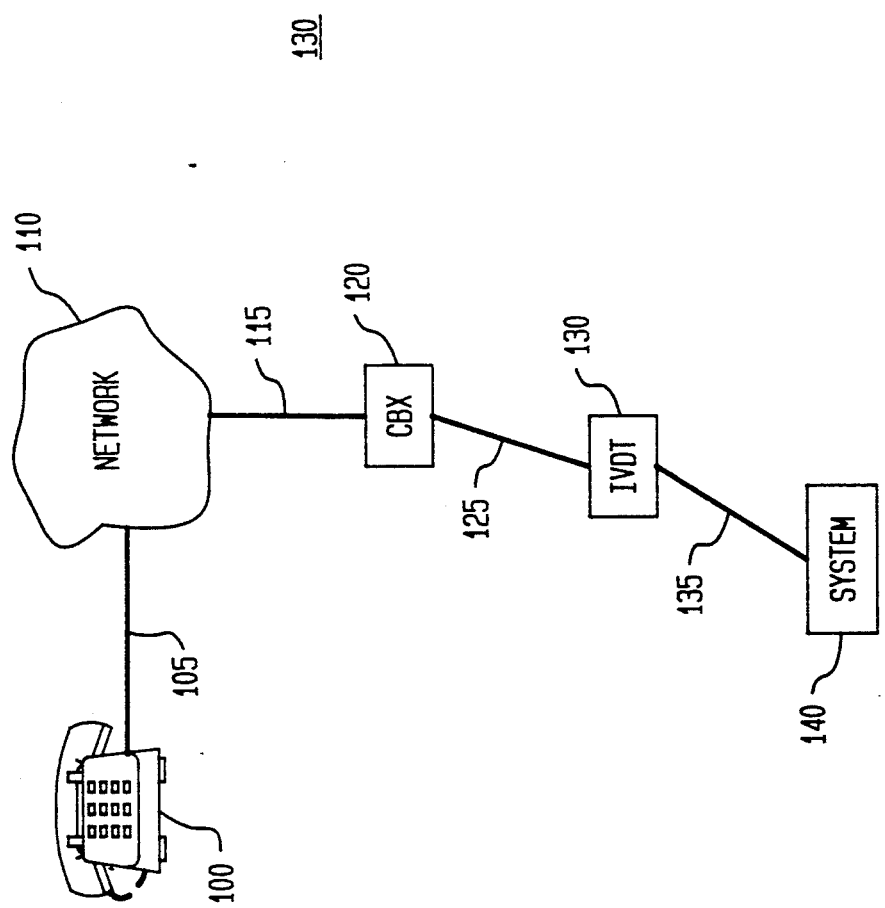
FIG. 1 is an block diagram which illustrates the manner in which an embodiment of the present invention is configured for use in a telephone environment.

FIG. 1 is a block diagram which illustrates the manner in which an embodiment of the present invention is configured for use in a telephone environment. As shown in FIG. 1, a calling party at telephone 100 places a telephone call which is transmitted over telephone line 105 to telephone network 110, for example, the public switched network ("PSTN"). The call is transmitted, in turn, over telephone line 115 to private business exchange 120, for example, 9751 CBX computerized switching machine 120 manufactured by ROLM Systems of Santa Clara, Calif. Lastly, the telephone call is transmitted over connecting link 125, for example, ROLMlink TM connecting link 125 manufactured by ROLM Systems of Santa Clara, Calif., to integrated voice data terminal IVDT 130, for example, ROLM TM Cypress TM IVDT 10 manufactured by ROLM Systems of Santa Clara, Calif. ROLM Cypress IVDT 10 is a personal communication terminal which also comprises an integrated digital telephone. IVDT 10 communicates with system 140 which will be described in further detail below.

Figure 2:
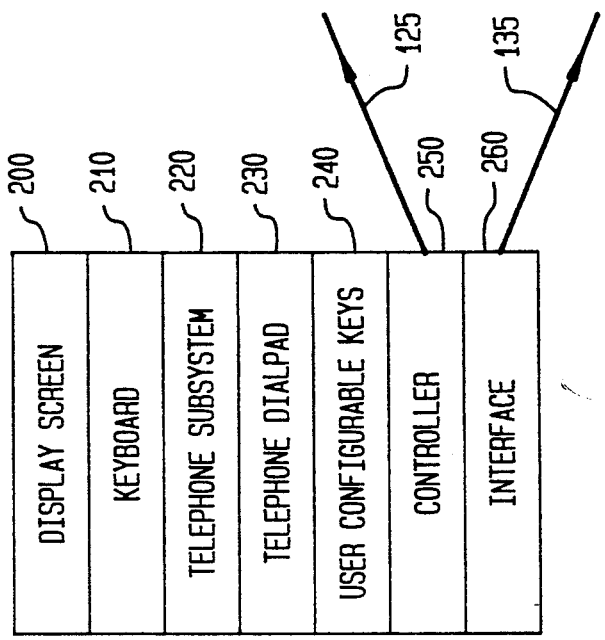
FIG. 2 is a block diagram of an integrated voice data terminal ("IVDT") which is used in fabricating an embodiment of the present invention.

FIG. 2 is a block diagram of IVDT 130 which is used to fabricate a preferred embodiment of the present invention. As shown in FIG. 2, IVDT 130 comprises: (a) display screen 200; (b) keyboard 210 which provides full ASCII input capability and which provides cursor control keys for use in conjunction with display screen 200; (c) telephony subsystem 220, including a receiver; (d) telephone dialpad 230 for use in conjunction with telephony subsystem 220; (e) user configurable keys 240 for use in conjunction with telephony subsystem 220, for example, user configurable keys 240 comprise repeat dial keys, line keys, and telephone function keys such as, for example, HOLD, CONNECT, and TRANSFER keys; (f) controller 250 which interfaces link 125 and CBX 120 to provide control of the transmission of voice and data therebetween; and (g) interface 260, for example, an RS232-C serial port, for interfacing with system 140.

ROLMlink TM connecting link 125 is a single twisted pair of standard telephone wires which transmits digitized voice and data between CBX 120 and IVDT 130. CBX 120 comprises an interface (not shown) which converts analog voice signals into a digital data stream and which multiplexes this digital data stream with other digital signals and a telephone power signal into a signal which is transmitted over connecting link 125 to IVDT 130. Additionally, the interface in CBX 120 demultiplexes signals transmitted thereto over connecting link 125 from IVDT 130 into a digital data stream which corresponds to voice signals and into a digital data stream that corresponds to data signals. ROLMlink connecting link 125 operates at 256 Kbps where 64 Kbps is used to transmit digitized voice, 64 Kbps is used to transmit data, and the remaining 128 Kbps is used to transmit control signals, error detection signals and other signals which are not relevant here. CBX 120 provides switching of voice signals as well as switching of data signals.

Although we will describe an embodiment of the present invention wherein IVDT 130 interacts directly with system 140 to update a call log database contained therein, the present invention is not restricted to such an embodiment wherein a database is comprised in a local system. In particular, in one example of an alternative embodiment, IVDT 130 interacts with a remote system to update a call log database contained in the remote system by using the data switching capability of CBX 120. In such an alternative embodiment, IVDT 130 places a data call to the remote system by transmitting the call over connecting link 125 to CBX 120. CBX 120, in turn, transmits the data call to the remote system—the remote system may be an on-premises system which interacts directly with CBX 120 or an off-premises system which interacts with CBX 120 through network 110. Notwithstanding whether the interaction between IVDT 130 and a system which is comprised of a call log database be by means of: (a) direct interaction between IVDT 130 and system 140 utilizing link 135 or (b) remote interaction between IVDT 130 and a remote system, the logic of the interaction is much the same. As a result, for ease of understanding, the following describes the embodiment shown in FIG. 1 which utilizes direct interaction between IVDT 130 and system 140 over link 135. Having provided this description, it will be clear to those of ordinary skill in the art as to the manner in which such embodiments may be modified to operate by means of remote interaction.

In either case, however, if IVDT 130 is embodied as, for example, a ROLM Cypress IVDT, database access may be simplified by the ability of the ROLM Cypress IVDT to define and store terminal profiles and log-on sequences. For example, parameters such as data rate, parity, echoplex, terminal type, and log-on sequence may be generated and stored for a particular database so that database access may be accomplished by the issuance of a single command. This is useful in providing access to remote databases stored in mainframes, minicomputers, and public information services. Further, the ability of the ROLM Cypress IVDT to store and implement personal communications software (PCS) provides easy access to a remote database and, once a connection is made thereto, PCS makes possible rapid access to data files.

Figure 3:
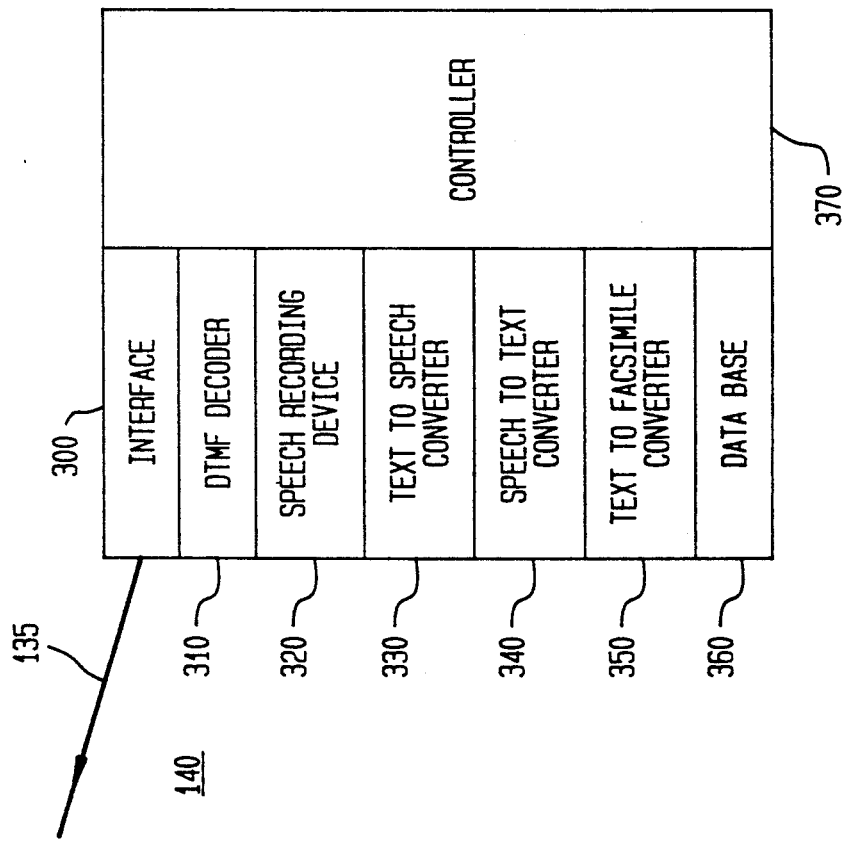
FIG. 3 is a block diagram of a system which is used, in conjunction with the IVDT shown in FIG. 2, in fabricating an embodiment of the present invention.

As shown in FIG. 3, system 140 comprises: (a) interface 300; (b) DTMF decoder 310; (c) speech recording device 320; (d) text to speech converter 330; (e) speech to text converter 340; (f) text to facsimile converter 350; (g) database 360; and (h) controller 370. Interface 300 is apparatus for interfacing link 135 and system 140 which is well known to those of ordinary skill in the art; DTMF decoder 310 is apparatus for receiving and decoding dual tone multifrequency signals which is commercially available and which well known to those of ordinary skill in the art; speech recording device 320 is apparatus for conversion of speech signals into digital form which is commercially available and which is well known to those of ordinary skill in the art; text to speech converter 330 is apparatus for transforming text into speech which is commercially available and which is well known to those of ordinary skill in the art; speech to text converter 340 is apparatus for transforming speech to text which is commercially available and which is well known to those of ordinary skill in the art; text to facsimile converter 350 is apparatus for transforming text into facsimile compatible data which is commercially available and which is well known to those of ordinary skill in the art; database 350 is stored on storage means such as magnetic disk storage which is well known to those of ordinary skill in the art; and controller 370 is apparatus for guiding the interaction of the portions of system 140 and its interaction with IVDT 130 in a manner which will be explained in detail below. Controller 370 may be a microprocessor such as an IBM PS/2 personal computer which is manufactured by International Business Machines Corporation.

The operation of the embodiment of the inventive automatic call annotation system will now be described in general in accordance with a description of the following three functions thereof: (a) capturing call activity information relating to a telephone call; (b) capturing call annotation information relating to the telephone call and linking the call activity information to the call annotation information to provide a call annotation log; and (c) providing user access to the call annotation log.

Capturing call activity information relating to a telephone call

Assume that a telephone call: (a) is placed by a person who uses IVDT 130 to place a telephone call to, for example, telephone 100—including the use, for example, of telephone dialpad 230 and telephone subsystem 220 or (b) is received by IVDT 130 from, for example, telephone 100—including the use of telephone subsystem 220. Whenever any new telephone call has been placed or has been received: (a) controller 250 interacts with ROLMlink connecting link 125 in a manner which is well known to those of ordinary skill in the art to extract call activity information relating to the telephone call and (b) system 140 is alerted through interface 300. System 140 sends a signal to IVDT 130 to cause it to transmit the call activity information thereto over link 135. In response, controller 370 causes this call activity information to be stored in database 360. Methods of updating database 360, i.e., adding, deleting, and changing information in a database, are well known to those of ordinary skill in the art. As a result, call activity information is automatically stored for each telephone call. In a preferred embodiment of the present invention, such call activity information includes: (a) the time and date of call—in this embodiment, time and date information is transmitted to IVDT 130 over connecting link 125 from CBX 120 in accordance with the operational capabilities of CBX 120; (b) for a telephone call from IVDT 130 to telephone 100: (i) the telephone number of the calling party, i.e., the telephone number of telephone subsystem 220 which is obtained from database 360, (ii) the telephone number of the called party, i.e., the telephone number of telephone 100 which is obtained from telephone subsystem 220 when the telephone call is initiated, (iii) the name of the called party which is obtained from database 360 using the called party telephone number as a retrieval key, if available, (iv) the duration of the call which is obtained from controller 250 from duration information which is transmitted to IVDT 130 from CBX 120 over link 125 when CBX 120 notifies IVDT 130 that the call has terminated by the user or by the called party, and (v) call status, i.e., ring, no answer, busy, connect, and so forth, which is obtained from controller 250 form call status information which is transmitted to IVDT 130 from CBX 120 over link 125; and (c) for a telephone call from telephone 100 to IVDT 130: (i) the telephone number of the called party, i.e., the telephone number of telephone subsystem 220 which is obtained from database 360 or the telephone number of the called party which is obtained from controller 250 from called party information which is transmitted to IVDT 130 from CBX 120 over link 125, (ii) the telephone number of the calling party, i.e., the telephone number of telephone 100 which is obtained from controller 250 from calling party information which is transmitted to IVDT 130 from CBX 120 over link 125, (iii) the name of the calling party which is obtained from database 360 using the calling party telephone number as a retrieval key, if available, (iv) the duration of the call which is obtained from controller 250 from duration information which is transmitted to IVDT 130 from CBX 120 over link 125 when CBX 120 notifies IVDT 130 that the call has terminated by the user or by the calling party, and (v) call status, i.e., ring, no answer, busy, connect, and so forth, which is obtained from controller 250 form call status information which is transmitted to IVDT 130 from CBX 120 over link 125.

Capturing annotation information relating to the telephone call and linking the call activity information to the call annotation information to provide a call annotation log When a telephone call is completed, a local user may generate call annotation information relating to the call. For example, when system 140 is notified that a call has terminated, system 140 retrieves a message from database 360 which is, for example, digitized speech. The message, in data form, is transmitted from interface 300 in system 140 to interface 260 in IVDT 130 and, from there it is played on a handset speaker associated with telephone subsystem 220. The message asks the user to respond if he/she wants to input call annotation information. A user may respond by: (a) pressing predetermined user configurable function keys 240; (b) pressing a predetermined sequence of dialpad keys 230; or (c) entering predetermined text using keyboard 210. The user's response is transmitted to system 140 where it is analyzed by controller 370 and, if translation of input from dialpad 230 is required, by DTMF decoder 310. If the user's response has indicated that no annotation will be made, no further action is taken. However, if the user's response has indicated that the user wishes to input call annotation information and the means by which that annotation will be made, system 140 prepares to receive the input. In accordance with the present invention, such call annotation information may be received by a number of means. For example, a user may enter call annotation information, i.e., comments relating to the call, by using keyboard 210 of IVDT 130 or by speaking into a receiver associated with telephone subsystem 220. If the user enters call annotation information by using keyboard 210, output from keyboard 210 is transmitted by interface 260 and interface 300 to controller 370. In turn, controller will update database 360 to store this call annotation information in a manner which is well known to those of ordinary skill in the art. However, if the user enters call annotation information by speaking into a receiver associated with telephone subsystem 220, output from telephone subsystem 220 is transmitted by interface 260 and interface 300 to speech recording device 320 for conversion into digital form for storage in database 360 in a manner which is well known to those of ordinary skill in the art. Then, notwithstanding whether the call annotation information was input by the user in the form of text or in the form of speech, the call annotation entry in database 360 is linked to the call activity information entry, i.e., the call activity log entry, in database 360 which relates to the telephone call.

Further, in a preferred embodiment of the present invention, a user may enter text annotations for a particular telephone call at any time during the conversation. For example, in one embodiment of the present invention, this occurs when a user enters call annotation information using keyboard 210 of IVDT 130. In this instance, controller 370 recognizes that call annotation information is being entered before the telephone call has ended and, as such, communicates with the user by transmitting text to be displayed to the user using display screen 200 at IVDT 130. Still further, in another embodiment of the present invention, a user may enter spoken annotations for a particular telephone call by entering such spoken annotations using the receiver associated with telephone subsystem 220 after first placing the other party on hold and after notifying system 140 by pressing a predetermined one or more of configurable keys 240 or by pressing predetermined sequences of keys on dialpad 230. As a result of the above, a user may enter voice or text call annotation information at any time, i.e., at any time during and/or after a telephone conversation.

In a further embodiment of the present invention which supports remote operation, a user places a telephone call to IVDT 130. IVDT 130 answers the telephone call and the user sends a message to IVDT 130 in the form of Touchtone ® signals. This message is transmitted to system 140 where it is decoded by controller 370, in conjunction with DTMF decoder 310. For example, as a part of the message, the user transmits a predetermined code which requests IVDT 130 to conference the telephone call with a specified called party and, in response, IVDT 130 transmits a message to CBX 120 which causes it to conference the telephone call with the specified called party. When the telephone call is complete, the user sends a message to IVDT 130 by, for example, pressing a predetermined sequence of dialpad keys such as, for example, * #, or by pressing a predetermined dialpad key for a few seconds. This message is transmitted to system 140 where it is decoded by controller 370, in conjunction with DTMF decoder 310. System 140 then interacts with the user using speech messages in the manner described above with respect to a local user. As a result, the remote user may enter call annotation information and this embodiment of the present invention provides a means whereby call log annotation information and call activity information can be linked automatically during a telephone call which is placed from a remote location.

Providing user access to the call annotation log

A user can interact with IVDT 130 to retrieve and review call log annotation information stored in database 360 in several modes. For example: (a) a local user may input retrieval requests for call annotation information using keyboard 210 and the user may receive the call annotation information on: (i) display screen 200, (ii) through a speaker associated with telephone subsystem 220, (iii) or through a facsimile device which is accessed by a telephone call placed by IVDT 130; (b) local user may input retrieval requests using predetermined sequences of configurable keys 240 or keypads on dialpad 230 and the user may receive the call annotation information on: (i) display screen 200, (ii) through a speaker associated with telephone subsystem 220, (iii) or through a facsimile device which is accessed by a telephone call placed by IVDT 130; and (c) a remote user may input retrieval requests using predetermined sequences of keypads on a telephone associated therewith and the user may receive the call annotation information on: (i) through a speaker associated with the telephone or (ii) through a facsimile device which is accessed by a telephone call placed by IVDT 130. In particular, the user can search for call annotation information based on any of the call activity information. Two examples of the manner in which call annotation information may be retrieved include:

Retrieve call annotation information and call activity information for calls received from ext. 3048 between Jun. 1, 1990 and Jun 11, 1990.

Retrieve call annotation information and call activity information for calls received from the 201 area code.

After searching for particular records the user can review the call annotation information. For example, a user can select a record and can have a text call annotation displayed or the user can listen to a previously recorded annotation. In addition, text call annotation and/or call activity information can also be converted to speech so that the user can listen to it. This conversion is valuable for remote listening. In further addition, the call annotation and/or call activity information which was entered: (a) as text can be converted to speech or facsimile type information and (b) as speech can be converted to text or facsimile type information.

Figure 4:
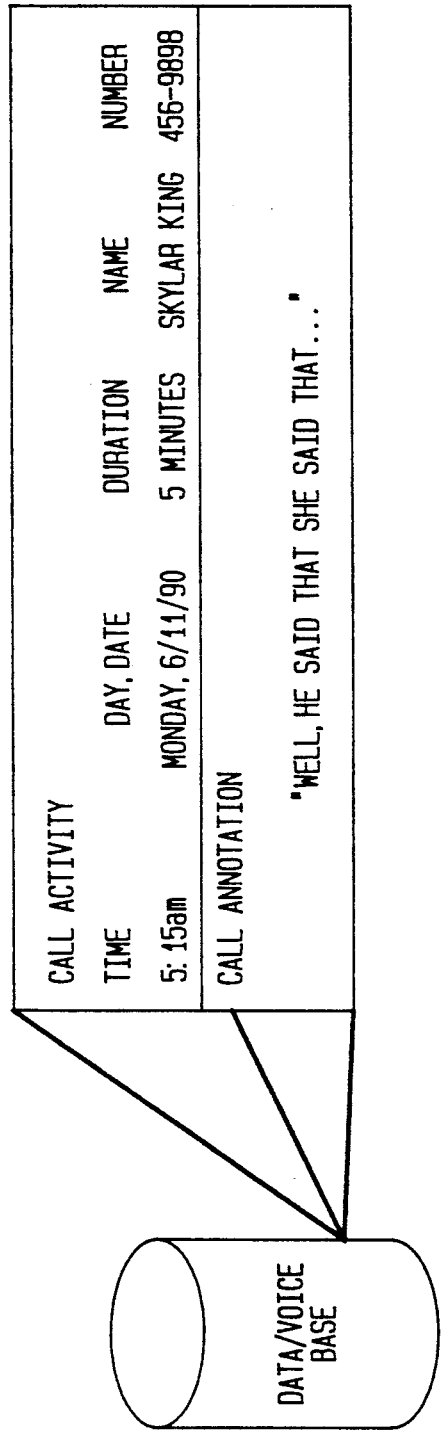
FIG. 4 shows, in pictorial form, the type of information which contained in an entry of a call log database which is fabricated in accordance with an embodiment of the present invention.

FIG. 4 shows a typical call activity record and its associated call annotation information record, which records are stored in database 360. Database 360 is a database system which stores a database on, for example, magnetic disk storage. Further, information is accessed from this database and this database is created in a manner which is well known to those of ordinary skill in the art. It should be clear to those of ordinary skill in the art that the present invention is not limited to the use of database which is created and maintained by a processor such as a personal computer and, in other embodiments, database 360 may reside at a local location which is served by CBX 120 or it may be located at a remote location which is reached using network 110. In such an embodiment, the database would be accessed in real time by system 140 through IVDT 130 by using the data transmission capabilities of connecting link 125 processor or portions of the database could be transferred, i.e., downloaded, from the remote database from time-to-time, as needed.

Consider the following example of the operation of an embodiment of the present invention which illustrates its use. Clarke Kent, a news reporter, is covering a story out of town. He calls an automatic call annotation system in his office at the Daily Planet. He requests the system to transfer him to Lois Lane. After talking with her, he presses the * key on the telephone that he is calling from. The system disconnects his call with Lois and allows him to record a summary of the call. He records the coded information that Lois had provided him with, "Pigs do fly." The system links the recorded information with the call activity information: Lois Lane, x254, Jun. 6, 1990, 3:43PM. Later, Clarke is ready to work on breaking the coded information that Lois had given him. He calls his automatic call annotation system. The system prompts him as to whether Clarke wishes to: (a) place a call or (b) retrieve call information. Clarke presses 2 on his Touchtone telephone to indicate that he would like to retrieve call information. He is prompted to enter the telephone number of the call information that he would like to retrieve. He enters 254 on the telephone keypad. The system replays the recorded comments for the most recent call record meeting the selection criteria: "Pigs do fly." Clarke is prompted as to whether he would like to hear: (a) the next most recent call summary for extension 254 or (b) not. He indicates "no" by pressing 2. Then, he hangs up to begin cracking the code.

Further, those skilled in the art recognize that further embodiments of the present invention may be made without departing from its teachings. For example, embodiments of the present invention may be fabricated utilizing a ROLMphone 244PC which is manufactured by ROLM Systems of Austin, Texas and which interfaces with a personal computer by means of an RS232C interface.

What is claimed is:

1. Apparatus for receiving and storing call activity information in a call log database and for storing call annotation information in a call annotation database, which apparatus comprises:
   interaction means for interacting with a telephone apparatus in response to call activity which occurs as a result of use of the telephone apparatus;
   processor means, responsive to output from the interaction means, for obtaining call activity information related to the all activity;
   means for storing the call activity information provided by the processor means;
   user interaction means for interacting with a user to obtain call annotation information from the user which is related to the call activity; and
   means, responsive to output from the user interaction means, for storing the call annotation information in the call annotation database in association with the call activity information.

2. The apparatus of claim 1 wherein the user interaction means further comprises display means for retrieving information from the call log database or the call annotation database or a combination of both said call log database and said call annotation database and for providing such information to the user.

3. The apparatus of claim 1 wherein the processor means utilizes output from the interaction means to provide access to translation means for determining identification information of a calling or called party or a combination of both said calling party and said called party of the call activity.

4. The apparatus of claim 3 wherein the translation means determines the identification information by accessing a database system.

5. The apparatus of claim 1 wherein the call activity information comprises at least one telephone number and wherein the interaction means further comprises means for causing the telephone apparatus to dial a telephone number stored as part of the call activity information in the call log database.

6. The apparatus of claim 2 wherein the display means further comprises means for retrieving such information in response to retrieval information supplied by the user, such retrieval information comprising one or more of the type of information which comprises call activity information.

7. The apparatus of claim 2 wherein the display means further comprises means for scrolling through the call log database together with associated information from the call annotation database.

8. The apparatus of claim 2 wherein the display means further comprises means for providing the display for users satisfying predetermined identifications.

9. The apparatus of claim 1 wherein the user interaction means for obtaining call annotation information comprises means for obtaining call annotation information during the call activity or after the call activity has ended or a combination of both said during the call activity and said after the call activity has ended.

10. The apparatus of claim 9 wherein the user interaction means for obtaining call annotation information comprises means for obtaining call annotation information by voice input and/or by text input or by fax input or a combination of said voice input, said text input and said fax input.

11. The apparatus of claim 1 wherein the user interaction means for providing information to the user comprises means for providing information to the user as voice output or as text output or as fax output.

12. The apparatus of claim 11 wherein the user interaction means for obtaining call annotation information comprises means for obtaining call annotation information by voice input or by text input or by fax input or a combination of said voice input, said text input and said fax input and the user interaction means for providing information to the user comprises means for providing voice input or text input or fax input to the user as voice output or text output or fax output.

* * * * *